United States Patent [19]

Colvocoresses

[11] 4,313,678
[45] Feb. 2, 1982

[54] AUTOMATED SATELLITE MAPPING SYSTEM (MAPSAT)

[75] Inventor: Alden P. Colvocoresses, Fairfax, Va.

[73] Assignee: The United States of America as represented by the Secretary of the Interior, Washington, D.C.

[21] Appl. No.: 78,358

[22] Filed: Sep. 24, 1979

[51] Int. Cl.³ .............................................. G01C 7/02
[52] U.S. Cl. ....................................... 356/2; 356/1; 356/376
[58] Field of Search ........................... 356/1, 2, 4, 376; 250/558; 358/88

[56] References Cited

U.S. PATENT DOCUMENTS

| | | | |
|---|---|---|---|
| 3,527,880 | 9/1970 | Gordon | 358/88 |
| 3,783,294 | 1/1974 | Koper | 356/2 |
| 4,189,232 | 2/1980 | Asano et al. | 356/1 |

Primary Examiner—R. A. Rosenberger
Attorney, Agent, or Firm—Donald A. Gardiner

[57] ABSTRACT

A system for automatically mapping the surface of a celestial body is presented. A satellite in a near polar sun-synchronous orbit about the body includes two or three linear sensing photo-detector arrays mounted transversely to the satellite heading. With two arrays, both are oriented at the same angle to the geometric vertical, with one aimed forward and the other aft along the apparent track of the satellite. With three arrays, the third array is oriented downward toward the geometric vertical. Two of the arrays are used to sense the body surface with the satellite velocity providing continuous imaging. With rugged terrain, one angled array and the vertical array sense linear strips of the body disposed parallel to the apparent path of the satellite. With relatively flat terrain the angled arrays are used. Data is acquired by sensing the same elemental areas of strips from a first position in space with a first array, and once the satellite has moved to a second position, with the second array. The two satellite positions and an incremental area on the ground define an equipolar plane. The two arrays produce two data flows which, when correlated, result in data representative of elevational information for each incremental area of each strip. The system allows near real-time mapping since the imaged areas being compared are included in an equipolar plane, making data correlation for topographic information a matter of comparing the two one-dimensional records.

10 Claims, 11 Drawing Figures

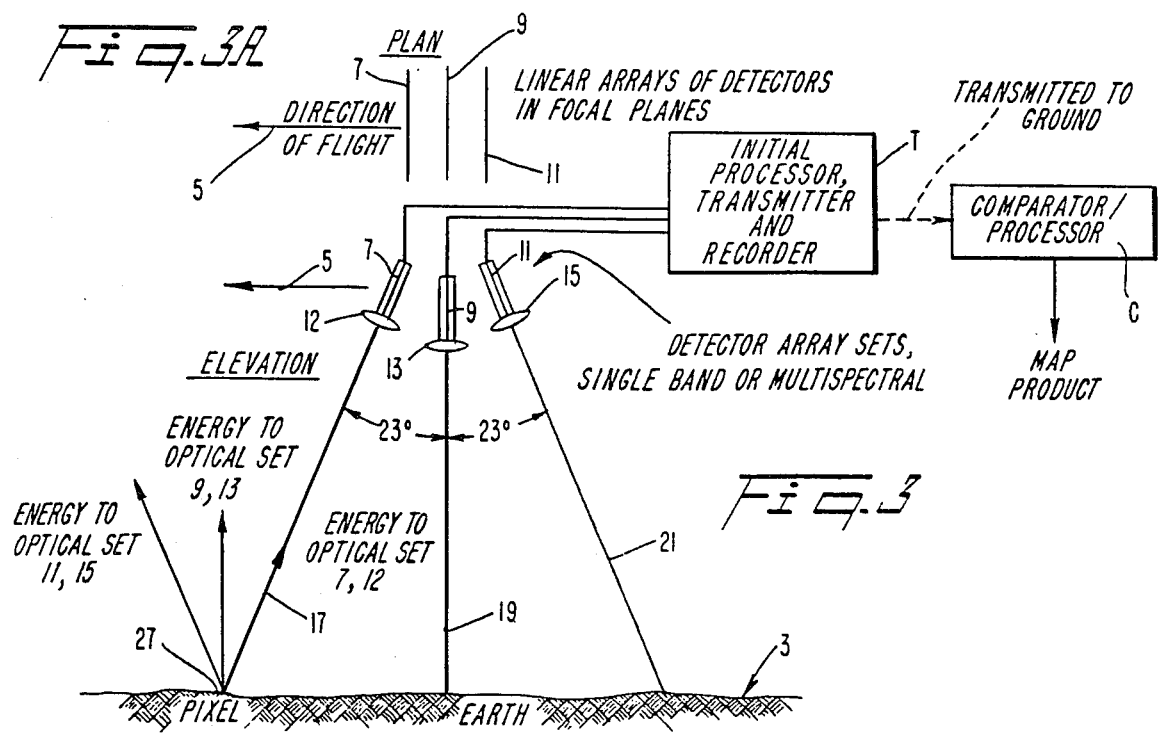
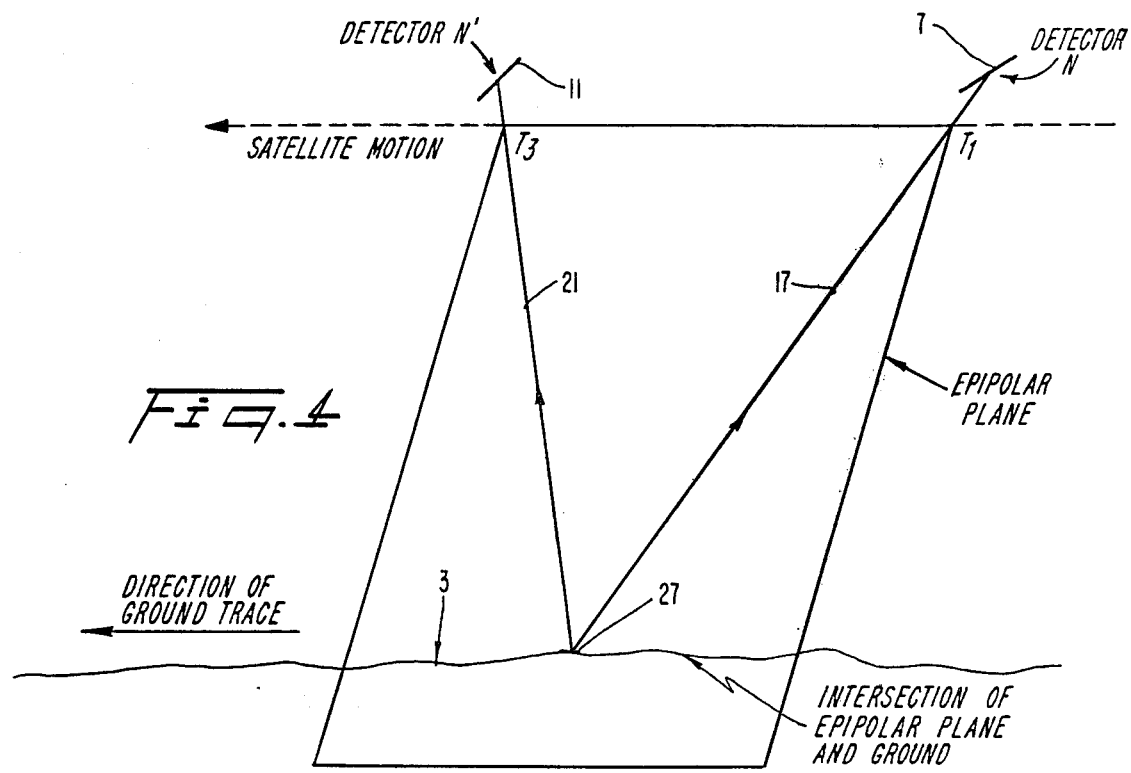

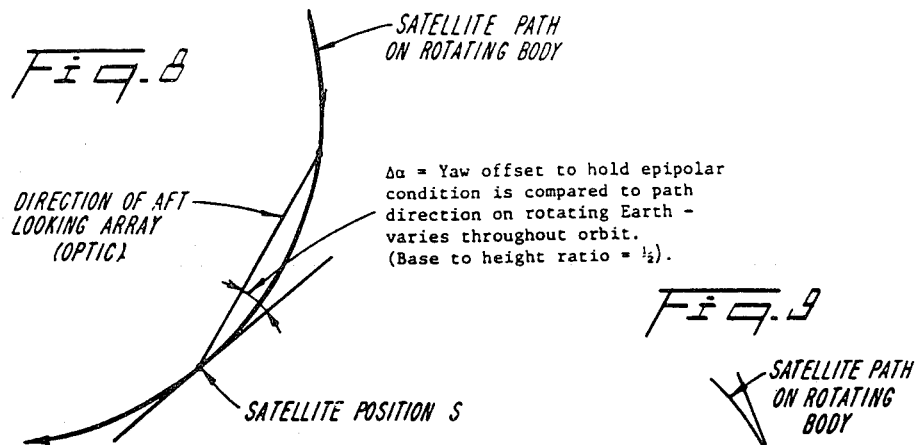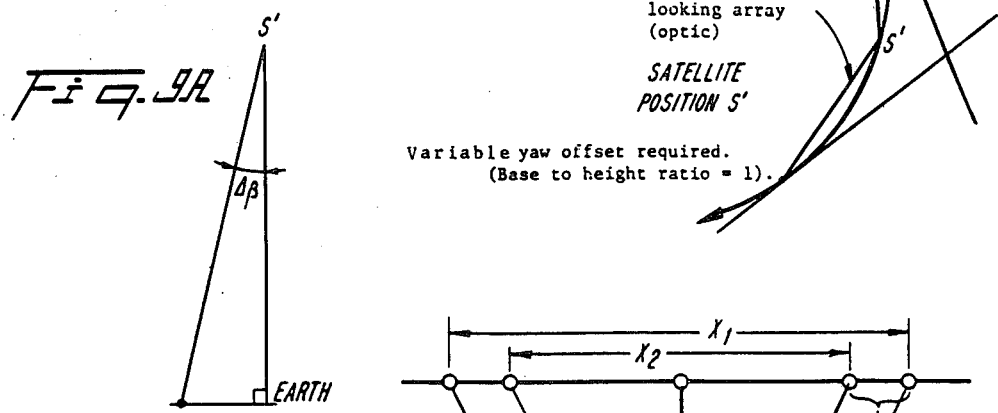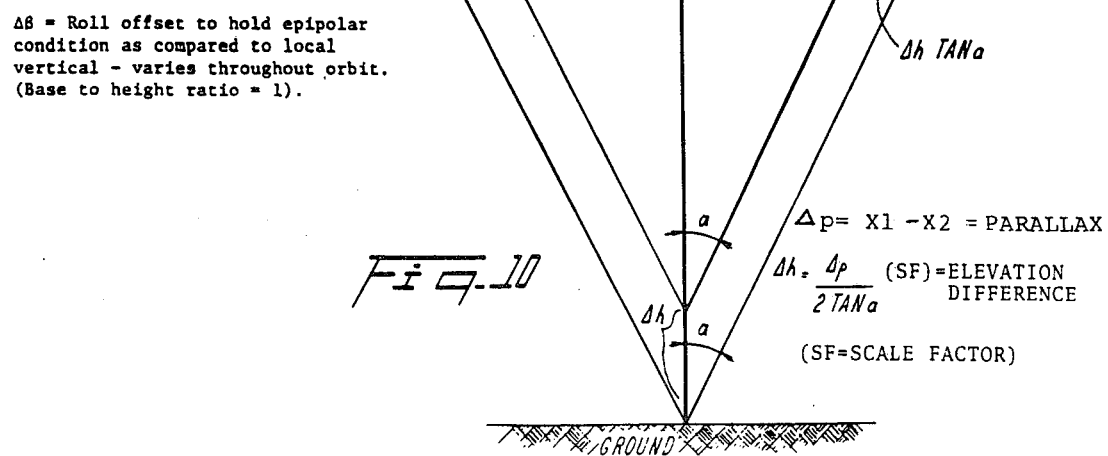

AUTOMATED SATELLITE MAPPING SYSTEM (MAPSAT)

BACKGROUND OF THE INVENTION

The invention relates to the field of automated mapping systems and more particularly to a system for automatically acquiring planimetric and topographic data of a celestial body in near real time.

Many techniques have been devised for mapping the surface of a celestial body, such as the earth, to provide both planimetric (two-dimensional) and topographic (elevation) information. Prior to the advent of orbiting space satellites, most such data acquisition and mapping was done by aircraft which carried photographic cameras suitable for obtaining stereoscopic coverages. Such techniques are still useful for providing high resolution stereoscopic views of relatively small areas of the surface, but such techniques are limited in that they involve an enormous amount of tme and funds to map large areas of the earth. In addition, in order to produce maps containing elevational information from the stereo photographs, each such stereo pair must be precisely oriented and calibrated using complex normally hand-driven stereoplotter apparatus. The resultant map is at least in part, commonly drawn by hand with the topographic contours being added by compilation from the model created by the stereo photographs.

Satellite imaging systems have been used for the past ten years for recording in an orthographic (two-dimensional) mode surface features of the earth. Such satellites as Landsats 1, 2, and 3 are characterized in having near polar, sun-synchronous circular orbits which allow continuous mapping of the entire earth's surface (excluding a small portion of the polar and cloud covered areas) in approximately eighteen days. Landsats and their Apollo predecessors have successfully used conventional photographic, Vidicon, and mechanical scanner-type imaging systems to record planimetric and radiometric data of the imaged area below the path of the moving satellite. However, none of the currently available earth imaging satellites has the ability to properly resolve the third dimension in a continuous mode suitable for automated processing.

With conventional photographic systems, a great deal of the total cost and time arises in the image data processing. Even with Landsat, which is a digital system, data processing is the principal item of concern. Currently, U.S. based processing facilities are limited to processing approximately 100 Landsat orthographic images (185 km by 160 km; 79 m by 79 m pixel) per day. It can thus be appreciated that stereoscopic imaging of the earth, using conventional imaging wherein two distance separated images are made would impose an even greater burden on present processing facilities since not only would each image have to be geometrically and radiometrically corrected, but each stereoscopic pair of images would have to be correlated and digitized point by point to derive topographic data therefrom.

In order to overcome some of the difficulties of stereographic mapping techniques, it has been proposed (Katz, *Height Measurements with the Stereoscopic Continuous Strip Camera*, Photogrammetric Engineering, Vol. 18, No. 1 Mar. 1952, pp. 53–62) that height measurements could be made with an airborne stereoscopic continuous-strip type camera. It has also recently been proposed that conventional stereo image pairs can be scanned using epipolar-scan principles, thus reducing the image correlation (for elevational information) from a two- to a one-dimensional task. (Helava and Chapelle, *Epipolar Scan Correction*, Bendix Technical Journal, Spring, 1972, pp. 19–23). Epipolar scanning refers to a pair of scan lines in a plane which contains the air base of a stereo pair of images. It may also be applied to scan lines in a plane involving two satellite positions from which the earth is viewed and is referred to herein as the epipolar plane concept.

Apparatus has also been developed for automatically scanning stereo photo pairs using epipolar scanning and one-dimensional digital image correlation (Scarano and Brumm, *A Digital Elevation Data Collecting System*, Photogrammetric Engineering and Remote Sensing, vol. 42, No. 4, Apr. 1976, pp. 489–496). Thus, the concept of reducing photogrammetric data fro two- to one-dimension is well established, but the prior art does not describe the possibility of imaging the earth directly in stereoscopic digital form suitable for one-dimensional processing utilizing the epipolar plane concept.

Recent developments in solid state imaging detector technology have produced linear solid state photodetector array sets capable of imaging upwards of 20,000 separate picture elements (pixels) along the face of the array. Such arrays have desirable properties such as low power use, multi-spectral capabilities, low weight, and no moving parts which is a definite advantage in the satellite environment where rotational stability of this type of mapping satellite considered should be in the order of $10^{-6}$ degrees per second for optimum results.

Thus, there is a need for a automated satellite mapping system which has high stability, a minimum of moving parts, and the ability to image the earth in both planimetric and topographic modes and in one or a variety of spectral bands. Such a satellite mapping system must also utilize the epipolar plan concept to reduce data correlation for elevational information to one-dimensional processing in near real time.

One objective is to provide a method and apparatus for imaging the surface of a body to provide high resolution, panchromatic or multispectral data of the body.

Another objective is to provide a method and apparatus for imaging the surface of a body wherein both planimetric and topographic data are acquired.

The final objective of the invention is to provide a method and apparatus by which the planimetric and topographic data can be processed in near real time to produce visual images and a wide variety of planimetric, topographic and thematic map products.

SUMMARY OF THE INVENTION

The above and other objectives and features are achieved by the present invention wherein there is provided a method and apparatus for automatically acquiring topographic data of a body, such as the earth. A relatively stable platform, such as a satellite, is spaced apart from the body, with the platform including linear arrays for continuous sensing of the body.

An array consists of several thousand detectors each of which generates a discrete signal flow or stream based on the radiometric response which is reflected solar plus emitted energy in or near the visible wave lengths. The number of detectors coupled with the optical system employed determines the resolution of the imaging system. The array sets are mounted in the focal plane of the optical systems. For purposes of this presentation, only one array set is indicated for each set of optics thus providing a single (panchromatic) response. However, two or more arrays can be placed in the focal plane of each set of optics, thus providing for multispectral response. A minimum of two, but preferably three, sets of optics are utilized. One set of optics is oriented vertically with the other one (or two) oriented at an acute angle fore (and aft) along the satellite track. The linear array set (or array sets) are oriented transversely to the satellite heading. It is anticipated that where three optics or sets are involved, only two are activated at any given time.

As the platform (satellite) moves across the body each detector of each array set generates a flow of data in a path generally parallel to the satellite path. Two detectors located on differently oriented array sets thus image the same finite area of the body but at different times and from different aspect angles. To achieve the epipolar plane condition the image data generated by a specific detector of the first array set to image the body must correspond to the data generated by a specific detector of the second array set to image the body. The two sets of data cover the same along-track strip on the body.

By image correlation (which can be automated) the differences in apparent positions of various definable points on the body represent differences in elevation. This is the fundamental principle of stereo photogrammetry which need no further disclosure here. The whole concept depends on precise positional and attitude information of the satellite with respect to the body. In the case of the earth, the satellite position must be known to within 30 meters of its true position with respect to the geometric center of the earth and the satellite (sensor) attitude must be known to within 10 arc seconds, again with reference to the geometric center of the earth. Such positioning is within the current state-of-the-art with respect to space technology.

Each detector on each array set generates a unique continuous flow of data which is either transmitted directly to earth or stored on tape for later transmission. In either case, the data can be transformed into digital form in which each discrete picture element (pixel) can be identified and reconstructed into image form. This technology is also well established.

One key element in the present invention is maintaining the epipolar plane condition so that the data from the same two detectors on different array sets (different optics) follow the same path on the body. This is complicated by the rotation of the body with respect to the satellite motion. In the case where one vertical and one tilted array set are used, the rotational effect of a body such as the earth can be compensated by introducing an appropriate amount of yaw (rotation about the vertical axis) in the satellite. In the case where the two tilted array sets are used, both yaw and roll (rotation about the heading axis must be introduced. For the earth case, formulas for compiling these rotational rates for a Landsat type of orbit have been derived and such can be derived for any other orbit and/or body which has defined motions. Once the stereo data is acquired under the defined epipolar plane conditions, it can be converted into both two and three dimensional map products using the automated technique described in the the Scarano and Brumm article, supra.

It should be noted that each pair of detectors on different array sets define their own epipolar plane. Thus, if there are 10,000 detectors in each array, 10,000 epipolar planes are created. This still retains the one-dimensional data processing concept since all the data is generated in the same along-track direction. The cross-track dimension is defined by the detector elements themselves which are fixed in place. The accuracy of such resulting map products depends on whether identifiable ground points of known position (control points) are or are not utilized. When an appropriate number of control points are used, the accuracy should be at least three times better than when no control points are used. In the case of the earth, there is a generally adequate distribution of control points to permit mapping at the higher accuracy. The utilization of control points as well as all other aspects of the above process lend themselves to automation.

The scale of the final map product depends largely on the resolution of the system (pixel size) which in turn is governed by the available data rates. In the earth case, there are no less than 13 Landsat receiving stations built or being built all of which can receive up to 15 megabits per second. If such a criteria is used in the earth case, the scale of the final map product is in the order of 1:50,000 or 1:00,000 scale and within National Map Accuracy Standards. These are map scales in general use throughout the world today.

BRIEF DESCRIPTION OF THE DRAWING FIGURES

These and other features and advantages are described in the following detailed description of the present invention taken in conjunction with the accompanying drawing figures (not to scale) wherein:

FIG. 3 is an elevational schematic view of one embodiment of the present invention showing the geometric relationship of the linear photodetector array sets with respect to one another and to the surface of a sensed body;

FIG. 3A is a plan view of FIG. 3 showing the relationship of the linear array sets relative to the direction of flight of the satellite;

FIG. 4 is a schematic elevational view showing the geometric relationship between the satellite and linear array sets between first and third imaging positions with respect to a sensed surface for one case;

FIG. 8 shows a portion of the path on the rotating earth and shows an example of the yaw offset that must be introduced when the first and second imaging positions are used and when the base to height ratio is equal to ½;

FIG. 9 shows a portion of the path on the rotating earth and shows an example of the yaw and roll offset that must be introduced when the first and third imaging positions are used and where the base to height ratio is equal to 1;

FIG. 9A is an elevation drawing which illustrates the roll offset that must be introduced when the first and third imaging positions are used (base to height ratio equal to 1);

FIG. 10 illustrates the basic geometric relationship by which elevation differences are determined through the stereoscopic mode.

DETAILED DESCRIPTION OF THE PREFERRED EMBODIMENT

Figure 1:
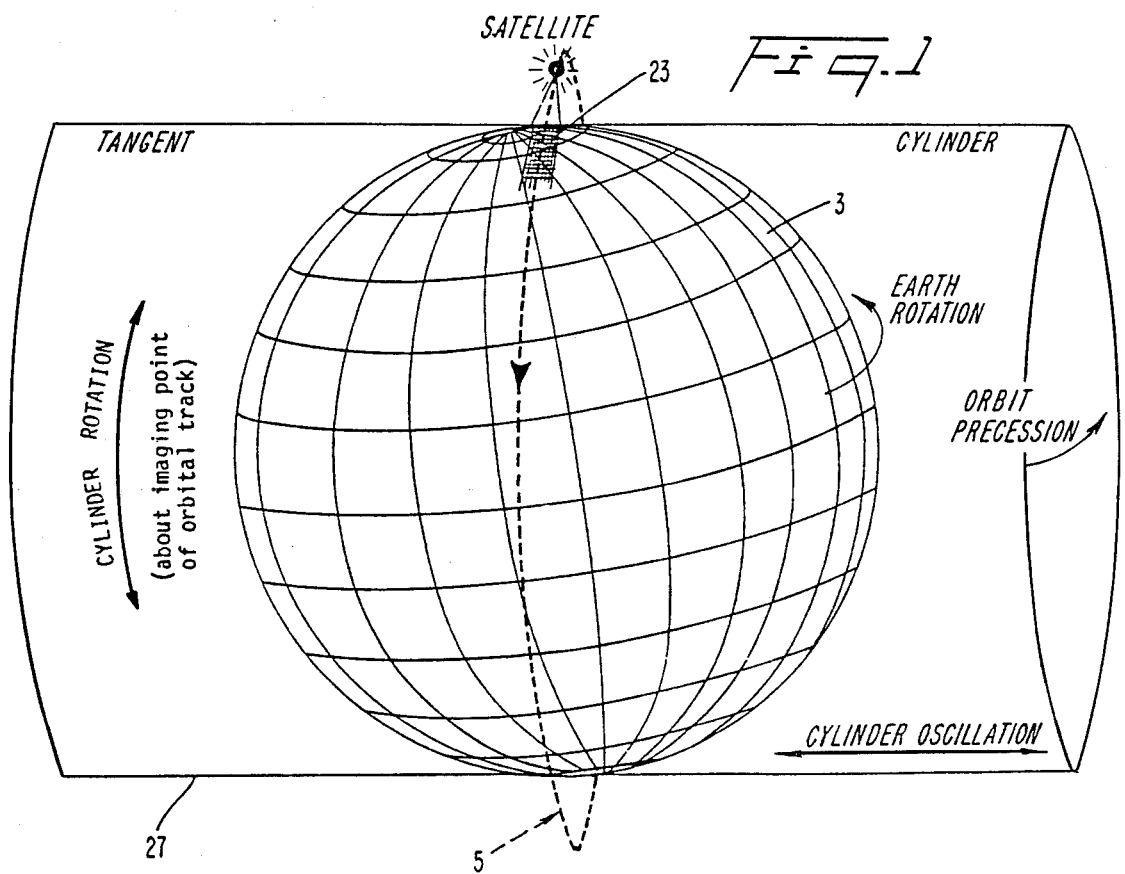
FIG. 1 is a schematic perspective view of a satellite orbiting a celestial body, such as the earth in a sun-synchronous, near polar orbit with the imagery being cast on a cylindrical map projection.

With reference to FIG. 1, a satellite 1 is shown in orbit around a rotating celestial body 3, such as the earth. The satellite is preferably placed in a sun synchronous, near polar circular orbit about rotating body 3. When satellite 1 is used to sense the earth, it is placed into an orbit inclined at approximately 9 degrees from the earth's poles. In order to provide a sun-synchronous orbit, the mean height above the earth's surface is maintained at approximately 919 kilometers which allows full coverage of the earth's surface (except for small areas near the poles) in 18 days. Satellite 1 follows a path 5 indicated by dashed lines in FIG. 1.

Satellite 1 includes a plurality of linear array sets of solid state photodetectors 7, 9 and 11. As schematically shown in FIG. 3, one detector array set 9 is oriented by optics 13 downwardly toward geometric vertical with respect to the surface of the body. Detector array sets 7 and 11 are respectively oriented forward and aft by optics 12, 15 along the track of the satellite. Detector array sets 7 and 11 are arranged at acute angles with respect to detector array set 9. In a preferred embodiment, these acute angles each have a value of 23°.

Interconnected through suitable leads with the photodetector array sets in the satellite is an initial processor, transmitter and recorder unit T (see FIG. 3) which receives the output signals of the array sets 7, 9, 11. Each received signal is indicative of spatial and radiometric information of each element of each linear array set. The initial processor performs transformations, data compaction and such other manipulations as are necessary to put the data in a form suitable for storage in the recorder or transmission. The information is then stored in the recorder or transmitted to earth where the individual signals are compared and map products are formed by further processing (see comparator/processor C, FIG. 3). The computer hardware and software involved can be adapted from well-known techniques.

Photodetector array sets 7, 9 and 11 (one or more arrays per set) are of a type well known in the art and each array is formed as a single linear strip of discrete solid state photodetectors. The photodetector array sets are aligned in a row transverse to the direction of travel of the satellite. Each photodetector is capable of continuously resolving along a strip 25 one picture element widths of an image projected thereon through appropriate optics. Each linear array set can range from 10 to 30 centimeters in length with upwards of 20,000 discrete photodetectors being included in each such linear array (see FIG. 2).

Each set of arrays 7, 9 and 11 respectively, includes associated optics 12, 13 and 15. The imaging optics can vary in focal length between 30 centimeters to 1 meter, depending upon the resolution desired. Since optics 12 and 15 image areas off the vertical, they are of about 10% longer focal length to provide resolution compatible with optics 13.

Linear photodetector array sets 7, 9 and 11, as indicated by lines 17, 19 and 21, are designed to image the surface of the earth in either panchromatic or multispectral mode.

Any two of the sets of arrays (7, 9 and 11) provide stereoscopic coverage of the earth's surface and when two or more arrays are used in the same set of optics, multispectral as well as stereoscopic coverage can be obtained. For general purpose earth viewing (preferred embodiment) three band multispectral array sets are proposed with each set of arrays (7, 9, and 11) using the same three wavebands. The three bands are 0.47 to 0.57 micrometers (blue-green), 0.57 to 0.70 micrometers (green-red) and 0.76 to 1.05 micrometers (near-infra-red). All three bands provide the same resolution which may vary from 10 to 30 meters at ground scale for each two-dimensional picture element 27 (pixel). Since data rates would be excessive if all three multispectral detector sets were operating at full resolution, selectivity and flexibility are introduced by which the resolution of any band can be reduced (or turned off). Thus, a wide variety of modes relative to wave band selection and resolution as well as monoscopic vs stereoscopic coverage is possible. This is important for the earth case since different areas call for differences in spectral response, stereographic response and resolution. Moreover, the linear array sets may be activated in part, resulting in only a portion of the width of the ground swath 23 being imaged on any one satellite pass. In some areas and conditions stereoscopic coverage is not required in which case only set of arrays 9 will be activated in either panchromatic or multispectral mode, and for either a portion of or the full swath width. The technology for providing such selectivity and flexibility is well established in the design and operation of linear array sets.

Each photodetector in a linear array set is capable of quantizing at least 64 radiometric levels. A 64-level quantization is normally adequate and this requires only a six bit (digital) signal, to be used to describe each such sensed picture element (pixel). Greater fineness of the quantized radiometric levels can be accomplished by using larger digital words to describe each quantized pixel. This leads to a design trade-off between ratiometric quantization and data transmission rates.

Figure 2:
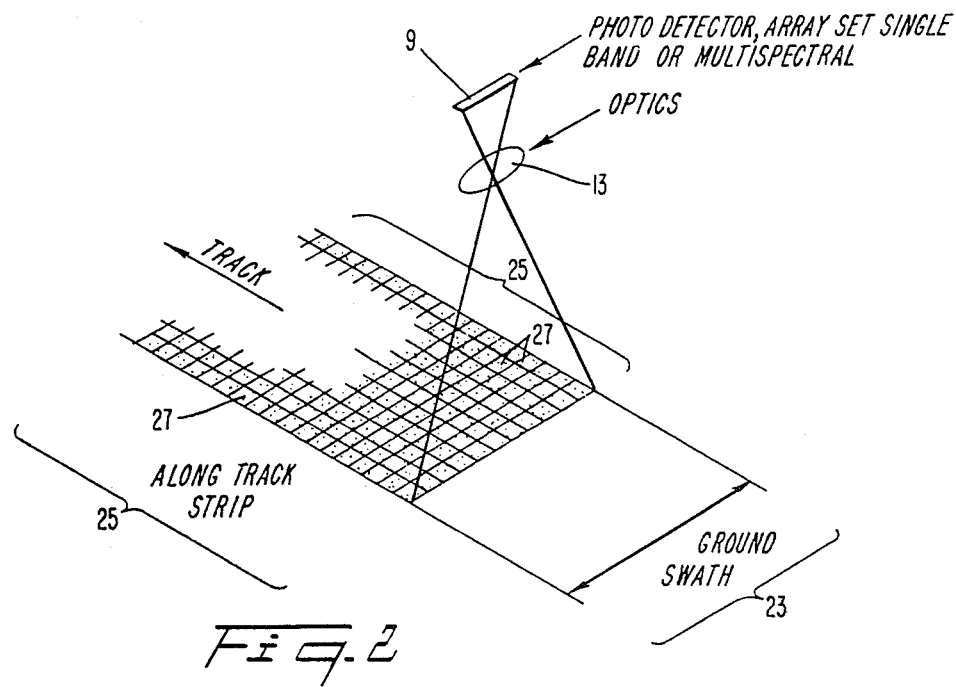
FIG. 2 is a perspective view (not to scale) of a solid state linear photodetector array set imaging along-track strips of a surface of a body.

As satellite 1 travels along orbital path 5, linear array sets 7, 9 and 11 image an along-track strip 25 of surface 3 of the earth. Optics 12, 13 and 15 provide a field of view of nearly 12° to linear array sets 7, 9 and 11. At the preferred orbital altitude of 919 kilometers this implies a swath width 23 of approximately 175 kilometers. As shown in FIG. 2, linear array set 9, for example, images along-track strips, such as strips 25 of surface 3 of the earth within ground swath 23. Linear array set 9 and array sets 7 and 11, are oriented substantially transversely to the direction of motion 5 of satellite 1 (FIG. 3A). Each linear strip 25 imaged within ground swath 23 is oriented substantially parallel to the direction of motion of the satellite with respect to the surface of the earth.

Within the current state-of-the-art, with respect to platform stability, positioning and attitude determination, absolute imaging accuracies (independent of control) in the 50 to 100 meter error range are expected. Accuracies of 7 to 25 meters, which permit mapping at 1:50,000 scale with contours of 20 to 50 meters at U.S. National Map Accuracy Standards are achievable through suitable ground control.

Topographic and planimetric data are acquired in accordance with the present invention by the above-described apparatus as follows. Two of the three linear array sets 7, 9 and 11 are used at a given time to continuously sense linear strips 25 along the surface of body 3. In the case where both planimetric and topographic (elevational) data are desired, one of the angled array sets 7 or 11 and vertical array set 9 are used to sense strips within ground swath 23. The choice of whether array sets 7 or 11 is used in combination with array set 9 depends upon the angle of the sun. Generally, aft-looking array set 11 is used during the descending (daylight) mode north of the equator while the fore-looking array set 7 is used south of the equator. In the case where maximum stereoscopic resolution of elevational differences of surface 3 is desired, the fore and aft array sets alone are used to image the body.

A key feature of the present invention made evident by reference to FIGS. 1 to 4 is in maintaining the orientation of the linear array sets with respect to the ground swath 23 imaged by the array sets such that a detector N of an array set at a first imaging position (occurring at time T1) and a corresponding detector N' of another array set at a second imaging position (occurring at subsequent time T2 or T3) along with the corresponding imaged point 27 of ground swath 23 defines an epipolar plane (see FIG. 4 for case where sets 7 and 11 are used). The epipolar condition implies a plane defined by two points in space and one on the ground. The epipolar plane condition must continue while the satellite motion results in continuous imaging along swath 23. The epipolar plane, which is defined in inertial space, exists as long as the same two detectors, from two array sets cover the same ground traced along individual strips 25.

Because each array set is looking at the body at a different aspect angle, that is vertical and/or, forward or aft of the vertical, rotation of body 3 causes a complication with respect to the epipolar plane. This complication can be overcome by yawing and/or rolling the satellite a few minutes of arc so that the ray to detector N of array set 7 at time T1 and the ray to detector N' of array set 9 (or 11) at time T2 (or T3) come from the same ground strip. Such an arrangement allows direct data correlation between data from detector N and detector N' for use in determining the elevation of a sensed area.

FIGS. 8, 9 and 9A illustrate the yawing and rolling corrections and achieving these are within the state of the art. FIG. 10 illustrates the basic state-of-the-art geometry by which elevation (height) is determined stereoscopically. In the figure delta h is an elevational difference which through associations with times of satellite travel is related to the difference between satellite travel distances $X_1$ and $X_2$. Thus, $X_1$ is the satellite travel during the time, such as T1, between the receipt of radiometric signals from a first point on the body, i.e., at an elevation $h_a$ above a datum, to the detectors of the fore array 7, and to the detectors of the aft array 11, and $X_2$ is the satellite travel during the time, such as T2, between the receipt of radiometric signals from a second point on the body, i.e., at an elevation $h_b$ above the datum, to the detectors of fore array 7, and to the detectors of aft array 11. With a constant satellite velocity and a constant satellite height above the datum being known, it is evident that the delta h data, (or difference between $h_b$ and $h_a$), for stereoscopic representations is determinable from the aforementioned times differences data signals produced by processor T shown in FIG. 3.

The rotational rate of the satellite is not perfect and thus the one-dimensional data flow for correlation purposes is of limited duration. Given state-of-the-art satellite stabilities on the order of $10^{-6}$ degrees per second, it is assumed that data from the detector N on array set 7 will drift from detector N' of array set 9 (or 11) to $N' \pm 1$ on these array sets but several thousand kilometers of satellite travel are involved in all cases. This does not introduce a serious problem with respect to processing as the data from a small number of detectors can be easily handled in modern computers.

Figure 5:
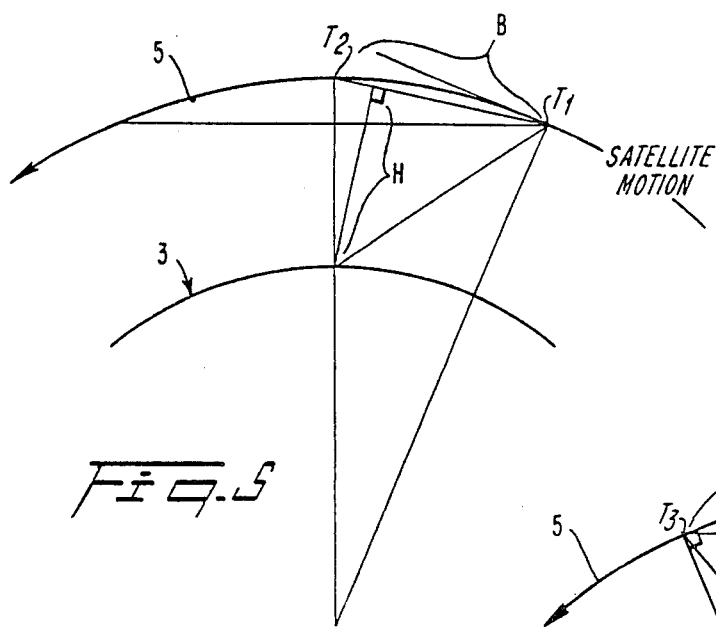
FIG. 5 is a geometrical representation of the relationship between the satellite in first and second imaging positions and the sensed surface of the body, where the base to height ratio is equl to ½.
Figure 6:
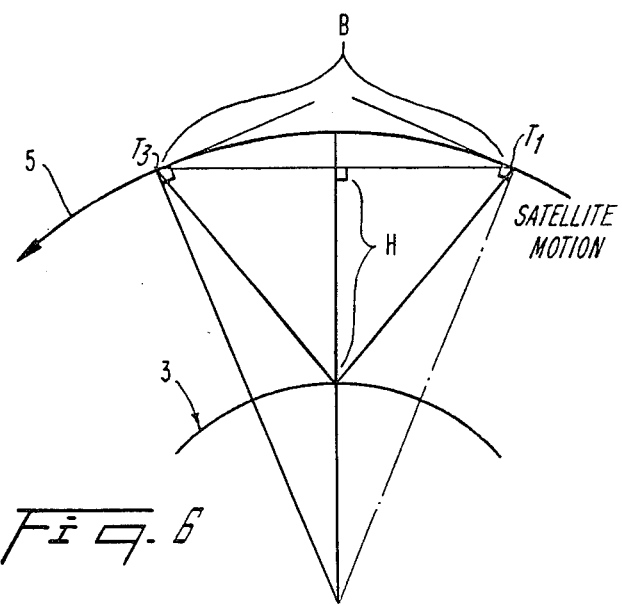
FIG. 6 is a geometrical representation of the relationship between the satellite in first and second imaging positions with respect to the sensed surface of the body, where the base to height ratio is equal to 1.

FIGS. 5 and 6 respectively define the conditions wherein the base-height ratio is $\frac{1}{2}$ and 1. A base-height ratio of $\frac{1}{2}$ is used in conjunction with vertical array 9 and either the fore or aft array sets 7, 11 respectively, when it is desired to acquire planimetric and stereoscopic topographic information over areas of moderate to steep relief. For flatter areas, a base height ratio of 1, using only fore and aft array sets 7 and 11, is appropriate. Of course, vertical array set 9 can be used alone for planimetry and radiometry.

Other factors, such as the ellipsoidal shape of the earth, the slight ellipticity of the satellite orbit, and the differential earth rotational velocity as a function of latitude, must also be taken into account. Such factors, however, are known and can be compensated by appropriate programming of the data processing equipment and/or through direct control of the satellite itself. For the case where one vertical and one tilted array set is used (base-height ratio of $\frac{1}{2}$), the epipolar plane condition can be maintained by applying appropriate yaw to the satellite which varies $\pm 4°$ from the nominal spacecraft heading along track 5 (FIG. 1). For the case of two tilted array sets (base-height ratio of 1), a slight roll offset of up to 0.1° (or approximately 7 minutes of arc) must be introduced in addition to yaw to keep the corresponding elements of each linear array set recording the same ground trace. Formulas which define the yaw and roll functions have been developed for the earth case.

An additional advantage arising from the use of continuous strip sensing along an epipolar plane is that data processing requirements for correlating two sets of signals to produce topographic data of an along-track strip 25 is relatively simple. Since each strip is represented by two separate one-dimensional flows of digital signals, these signals can be correlated with one another, element by element to produce output signals representative of the relative height or elevation of each incremental area.

The combination of epipolar scanning of linear strips of the surface of a celestial body along with solid state linear photodetector array sets which output a one-dimensional stream of data allows mapping the surface of such a body to be performed continuously and in near real-time.

Satellite 1 should contain enough memory to store a 175 kilometer wide swath of 15 by 15 meter pixels (single band) at least for 5,000 kilometers swath length. It is anticipated that when satellite 1 is within range of a satellite ground control station, data acquired by satellite 1 is normally transmitted to the ground station immediately as it is acquired and then processed. In the event that satellite 1 is out of sight of such a ground station, or if conditions require, the onboard recorder stores the data for subsequent transmission. Where data in excess of a prescribed limit, such as 15 megabits per second is being acquired, part of the data can be stored while the other part is directly transmitted to the ground station. The stored data can be transmitted at another time to the same or a different receiving station.

Figure 7:
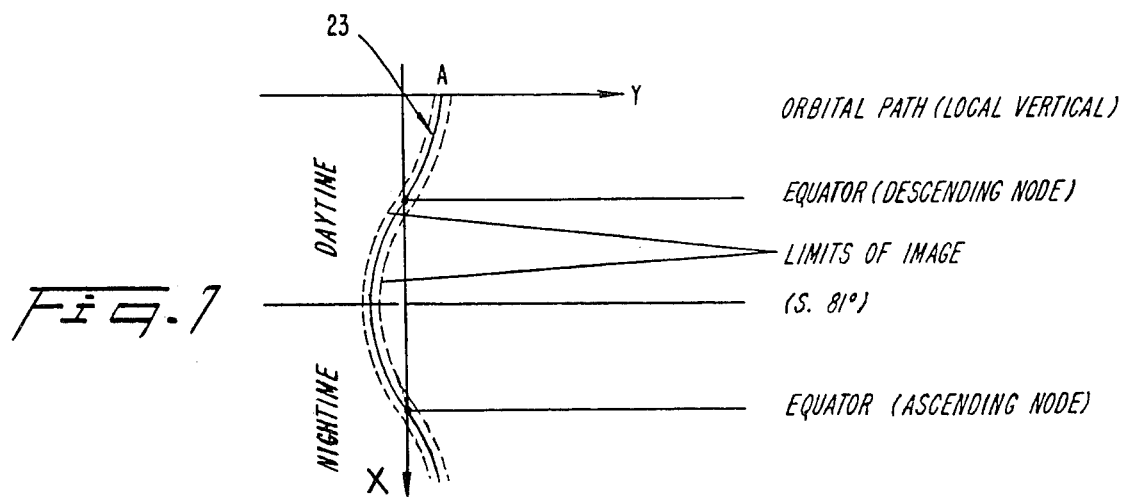
FIG. 7 illustrates the apparent path of the satellite during ascending and descending modes as projected on a cylindrical mapping surface, such as shown in FIG. 1.

Data acquired by satellite 1 can be processed by a variety of well-known techniques to produce black and white or multicolor images substantially free of geometric distortions and radiometric anomalies. The digital signals are processed and calibrated both radiometrically and geometrically to a defined map projection, such as the Space Oblique Mercator, described by the present inventor in *Photogrammetric Engineering*, pages 921–926 (1974). In this article, a two-dimensional mapping technique is described for use with a satellite, the projection surface of the map being a cylinder 27 disposed tangential to the earth and oblique to the polar axis, as shown in FIG. 1. Cylindrical surface 27 is oscillated along its axis at a compensating rate which varies with satellite latitude. FIG. 7 illustrates how an image acquired by satellite 1 is cast on the developed projection surface 27 of FIG. 1.

The system of the invention allows data acquisition and mapping of the surface of the body to be done in a variety of user-selectable modes. Panchromatic stereoscopic imaging can be done at maximum resolution for a portion, such as half, of the swath width at either base-height ratio, or at reduced resolution of the entire swath width at either base-height ratio. Alternatively, multispectral and stereoscopic imaging can be performed at maximum resolution over a portion of the swath width at either base-height ratio, or over the entire swath width at reduced resolution at either base-height ratio. Multispectral imaging can be performed by itself at maximum resolution over the entire swath width.

It is understood that while the present invention has been described with respect to a satellite rotating about the earth, the method and apparatus of the present invention is adaptable for imaging of the other celestial bodies. While the present invention has been described in considerable detail, it is understood that various changes and modifications would occur to one of ordinary skill in the art without departing from the spirit and scope of the appended claims.

I claim:

1. A method for acquiring panchromatic or multispectral topographic data of a celestial body through the use of a relatively stable platform spaced from said body and movable relative thereto, said platform carrying at least first and second linear array sets of radiometric sensing detectors aligned transversely to the direction of platform motion, said first and second sets being positioned on said platform at different angles from a geometric vertical with respect to the body for respectively sensing radiance from spaced areal elements of said body, comprising the steps of:

moving said platform across said body for sensing linear strips constituted by said areal elements of said body in a direction substantially parallel to the motion of said platform, continuously sensing said areal elements by scanning said linear strips with said first array set from a first position on said platform to produce flows of signal elements representative of one-dimensional spatial and radiometric information, continuously sensing the corresponding strips by scanning them with said second array set from a second position on said platform at said different angle aspect in epipolar planes defined by corresponding said first and second positions and said areal elements corresponding thereto, to produce a second series of flows of signal elements representative of one-dimensional spatial and radiometric information, and comparing the signal elements of said first signal flows with the corresponding signal elements of said second signal flows within the same epipolar planes to derive output signals indicative of elevational information for each areal element of each sensed strip.

2. The method of claim 1, further including the steps of:

yawing and rolling said platform to compensate for relative motion of said platform and the body so that said linear array sets continuously follow the strips formed on said body by the intersection of said epipolar planes with said body.

3. The method of claim 1 further including the steps of:

sensing with one of said array sets oriented to the geometrical vertical with respect to said body; and sensing with said other array set at an acute angle relative to said one array set, such that said other array set looks forward or aft along the sensed track of said body.

4. The method of claim 3 further including the steps of:

spacing said platform at an altitude H above said body; and moving said platform between said first and second sensing positions a distance B, the ratio B/H approximately equal to ½.

5. The method of claim 1 wherein at least one of said array sets acquires multispectral data.

6. The method of claim 1 further including the steps of:

sensing with said first and second array sets at acute angles to geometric vertical with respect to said body, such that said first array set looks forward and said second array set looks aft along the strips.

7. The method of claim 6 further including the steps of:

spacing said platform at an altitude H above said body; and moving said platform between said first and said second sensing positions a distance B, the ratio B/H approximately equal to 1.

8. A system for acquiring panchromatic or multispectral topographic data of a celestial body through the use of a relatively stable platform spaced apart from said body, and moving along a swath relative to said body, comprising:

linear sensing means mounted on said platform including a first array set directed toward the surface of the body and aligned transversely to the platform motion to sense along said swath;

a second array set directed at an angle to said first array set and aligned transversely to the platform motion to sense along said swath;

means for operating said array sets so as to continuously sense strips of said swath by said array sets at different times and from substantially spaced apart positions within the same epipolar planes, to produce first and second continuous flows of signal elements representative of one dimensional data of said sensed strips; and means for comparing the signal elements of said signal flows from said first and second array sets within the same epipolar plane to derive an output indicative of elevational information for the elements of the sensed strips.

9. A system for acquiring topographical data as set forth in claim 8 wherein is further provided:

a third array set directed at an angle to both said first and second array sets and positioned so as to be aligned along said swath, whereby multiple base-to-height ratios are permitted.

10. A system for acquiring topographical data as set forth in claim 9 wherein said second array set is oriented along the geometrical vertical, and said first and third array sets are oriented fore and aft of said second array sets at approximately 23°.

* * * * *